(12) United States Patent
Zhu

(10) Patent No.: US 8,757,942 B2
(45) Date of Patent: Jun. 24, 2014

(54) SEAL HEAD USED ON THE SIDE BEAM OF A VEHICLE CARRIER

(75) Inventor: Jianhua Zhu, Ningbo (CN)

(73) Assignee: Ningbo Bangda Intelligent Parking System Co., Ltd., Ningbo (CN)

( * ) Notice: Subject to any disclaimer, the term of this patent is extended or adjusted under 35 U.S.C. 154(b) by 0 days.

(21) Appl. No.: 13/807,848

(22) PCT Filed: Aug. 30, 2010

(86) PCT No.: PCT/CN2010/001310
§ 371 (c)(1),
(2), (4) Date: Dec. 31, 2012

(87) PCT Pub. No.: WO2012/003606
PCT Pub. Date: Jan. 12, 2012

(65) Prior Publication Data
US 2013/0097964 A1 Apr. 25, 2013

(30) Foreign Application Priority Data

Jul. 9, 2010 (CN) .......................... 2010 1 0226906

(51) Int. Cl.
*B60P 3/077* (2006.01)
*E04H 6/22* (2006.01)

(52) U.S. Cl.
CPC ................ *B60P 3/077* (2013.01); *E04H 6/225* (2013.01)
USPC ................................. 410/30; 410/156; 52/300

(58) Field of Classification Search
CPC ............. E04C 1/39; E04C 3/125; E04C 3/30; E04C 3/32; E04C 5/161; E04D 3/405; E04D 13/15; E04G 21/32; E04G 2021/32; E04H 4/141; E04H 17/20; E04H 6/225
USPC ................. 52/200, 301; 410/2, 3, 26, 30, 156
See application file for complete search history.

(56) References Cited

U.S. PATENT DOCUMENTS

| 4,066,289 A * | 1/1978 | Gargour ........................... 410/30 |
| 4,998,947 A * | 3/1991 | Dostall et al. ................... 52/300 |
| 6,709,208 B1 * | 3/2004 | Lyrstrand et al. ............... 410/30 |

* cited by examiner

*Primary Examiner* — Joshua J Michener
*Assistant Examiner* — Matthew J Smith
(74) *Attorney, Agent, or Firm* — Wang Law Firm, Inc.; Li K. Wang; Stephen Hsu

(57) ABSTRACT

A seal head used on a side beam of a vehicle carrier includes a main plane covering the front surface of the side beam, a side plane connected to the main plane to cover the inclined surface of the side beam, a first baffle plane and a second baffle plane covering the edges of the side beam, and the main plane, side plane, first baffle plane and second baffle plane form a semi-enclosed cavity for receiving the side beam. The baffle planes can be fixed against the corresponding edges of the side beam to achieve reliable fixed positions and connections, increasing the shock resistance rigidity and strength of the front surface of the side beam and easy installation and disassembly for seal head. The main plane, the side plane and the baffle plane are in an integrally molded piece to improve the rigidity and strength of side beam.

5 Claims, 5 Drawing Sheets

SEAL HEAD USED ON THE SIDE BEAM OF A VEHICLE CARRIER

CROSS REFERENCE TO RELATED APPLICATION

The present application is a PCT application No. PCT/CN2010/001310 entering the U.S.A. national stage and claiming the priority of the Chinese patent application No. 201010226906.7 filed on Jul. 9, 2010.

FIELD OF THE INVENTION

The present invention relates to a kind of a seal head, in particular to a seal head used on the side beam of a vehicle carrier.

DESCRIPTION OF THE PRIOR ART

Since a vehicle carrier is a main part for the vehicle to be parked in the three-dimensional parking garage, its design has a direct effect on the product quality and service life of the three-dimensional parking garage.

At present, the vehicle carrier is mostly of a plane structure which comprises two side beams paralleled to each other and a cross rail arranged between the two side beams. A lateral vehicle plate, also arranged between the two side beams, is just where the vehicle is parked. Usually, structural steel members are adopted as the side beams of the vehicle carrier, which are of such welding fabrication with bended riffled plate that the inner side and the front face form a right angle. When the parked vehicle is driven into or out of the parking space, the wheels on both sides of the vehicle will drive into or out the parking space separately along the inner side of the side beams from the front end of the vehicle carrier. In the case of deviation, the wheels on both sides of the vehicle are likely to run into the right angle so that the tires will get scratched and even become flat, thus directly affecting the safety and service life of the vehicle. In addition, the side beams are structural steel members with a hollow inside and inter-linked ends, leading to relatively weak rigidity and strength at both ends of the side beams. The whole appearance of the side beams are affected owing to the end sections exposed directly to the outside. Therefore, it's necessary to design a seal head matching the side beams and installed on the ends of the inclined plane of the side beams, so as to improve both the appearance and structural performance of the side beams.

SUMMARY OF THE INVENTION

It is an object of the present invention to provide a seal head used on the side beam of the vehicle carrier, which can effectively enhance the rigidity and strength of side beam.

For achieving the above stated object, a seal head used on the side beam of a vehicle carrier, the side beam having a front surface, an inclined surface, and edges, comprises a main plane covering the front surface of the side beam, a side plane connected to the main plane and inclined relative to the main plane to cover the inclined surface of the side beam, a first baffle plane perpendicularly connected to the main plane, and a second baffle plane extending from the side plane. Wherein the first baffle plane and the second baffle plane cover the edges of the side beam, and the main plane, the side plane, the first baffle plane and the second baffle plane, which are an integrally molded piece, form a semi-enclosed cavity for receiving the side beam.

In order to make the main plane better cover the front surface of the side beam, and conveniently connected with each other, preferably, the main plane has a pentagon shape and includes a first traverse edge, a second traverse edge parallel to the first traverse edge, a first vertical edge connected to a first end of the first traverse edge and a first end of the second traverse edge, a second vertical edge connected to a second end of the second traverse edge, an inclined edge respectively connected to a second end of the first traverse edge and the second vertical edge. The first baffle plane is connected to the first traverse edge, the second traverse edge, the first vertical edge and the second vertical edge, and a first portion of the first baffle plane that is coupled to the first traverse edge and is provided with a first mounting hole.

In order to make the connection of the side bean and the seal head more reliable, a second portion of the first baffle plane that is coupled to the second vertical edge comprises an inner baffle plane and an outer baffle plane, a slot for receiving the side beam is formed between the inner baffle plane and the outer baffle plane, and the outer baffle plane is provided with a second mounting hole. Except that the first baffle plane and the second baffle plane are respectively fixed against the corresponding edges of the side beam, the edges of the side beam are inserted into the slot formed between the inner baffle plane and the outer baffle plane when installed, which enable the side beam and the seal head to connect firmer, and further enhance the intensity and stiffness of side beam, avoiding the side beam away from pressing deformation.

In order to make the connection of the side bean and the seal head more reliable, preferably, a position protrusion is provided on an inner side of the main plane. The outer surface of the side beam is provided with a bending part in L-shaped, in which the position protrusion can be stuck, so as to make the connection of the seal head and the side beam more reliable and stable.

In order to make the side plane of the seal head better cover the inclined surface of the side beam, preferably, the side plane has a triangular shape with a first edge, a second edge and a third edge. The first edge is with the same as the inclined edge, the second baffle plane is coupled to the second edge and the third edge, a first portion of the second baffle plane that is coupled to the second edge is provided with a plurality of third mounting holes, and a second portion of the second baffle plane that is coupled to the third edge is provided with fourth mounting holes.

Compared with the prior art, in the present invention, the seal head comprises a main plane covering the front surface of the side beam and a side plane covering the inclined surface of the side beam, in addition, the baffle planes are respectively provided along the edges of the main plane and the side plane, which can respectively be fixed against the corresponding edges of the side beam, so as to achieve the reliable fixed position and connection, increasing the shock resistance rigidity and strength of the front surface of the side beam and easily installing and disassembling for seal head. In order to improve the rigidity and strength of side beam, the main plane, the side plane and the baffle plane formed an integrally molded piece via metal pressure or injection molding. Due to the side plane of the seal head to form an inclined plane installed on the side beam, which plays an important role of safety-oriented to avoid the bumps and scrapes caused by the beam and the inner side of the vehicles tires when driven into or out of the vehicle carrier for safety. Furthermore, the connection of the seal head and the side beam encloses the end of the side beam, which can protect the side beam and have an effect on reinforcing the side beam, increasing the service life and avoiding deformation for the side beam. In addition, special materials like phosphor can be added into the injection molding material of the seal head, which is a cautionary tale for security guarantees of the vehicles passing in or out, and is artistic as well.

DETAILED DESCRIPTION OF THE PREFERRED EMBODIMENT

Figure 1:
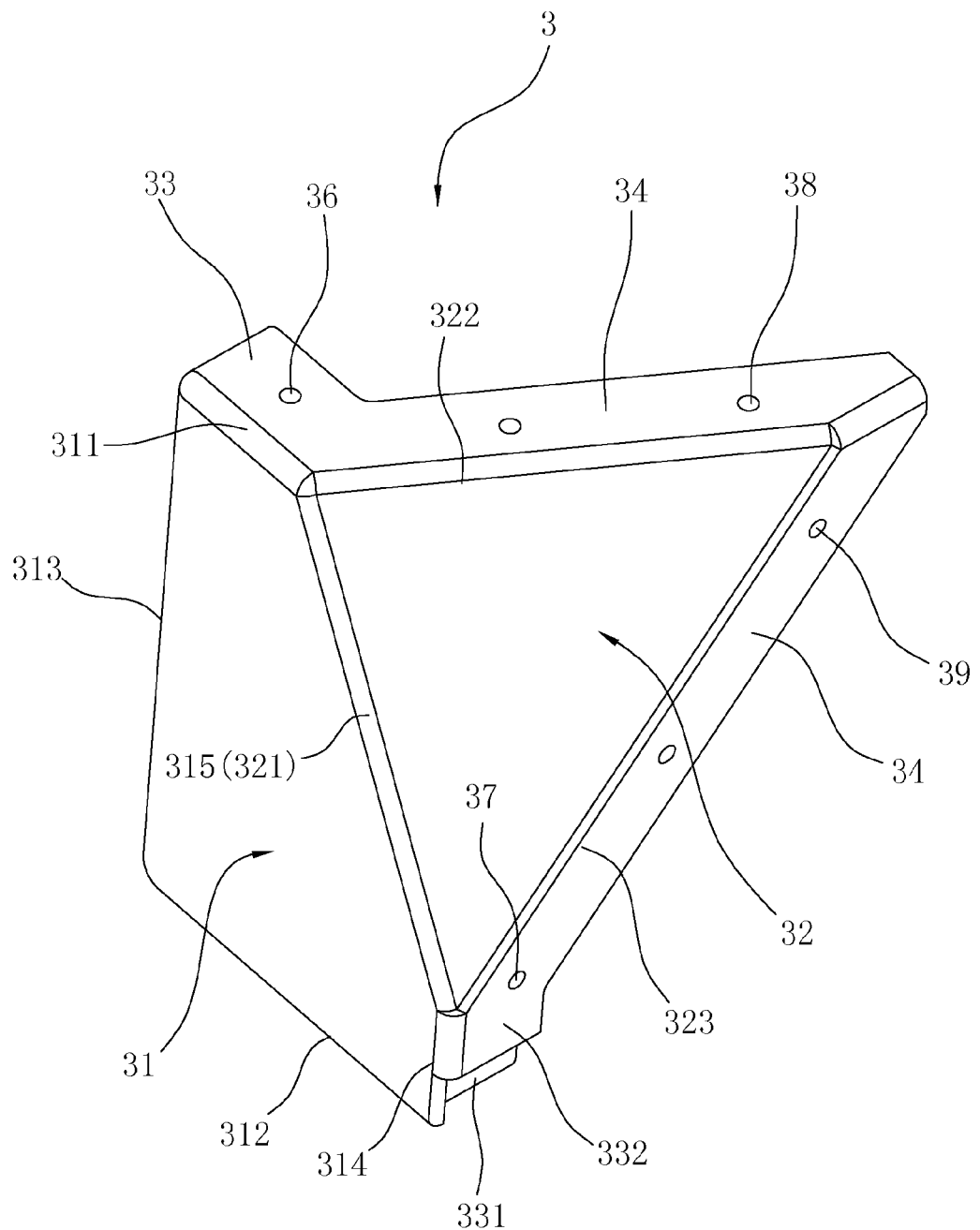
FIG. 1 is a first perspective view of a seal head in accordance with the embodiment of the present invention (seen from the front side of the seal head).
Figure 2:
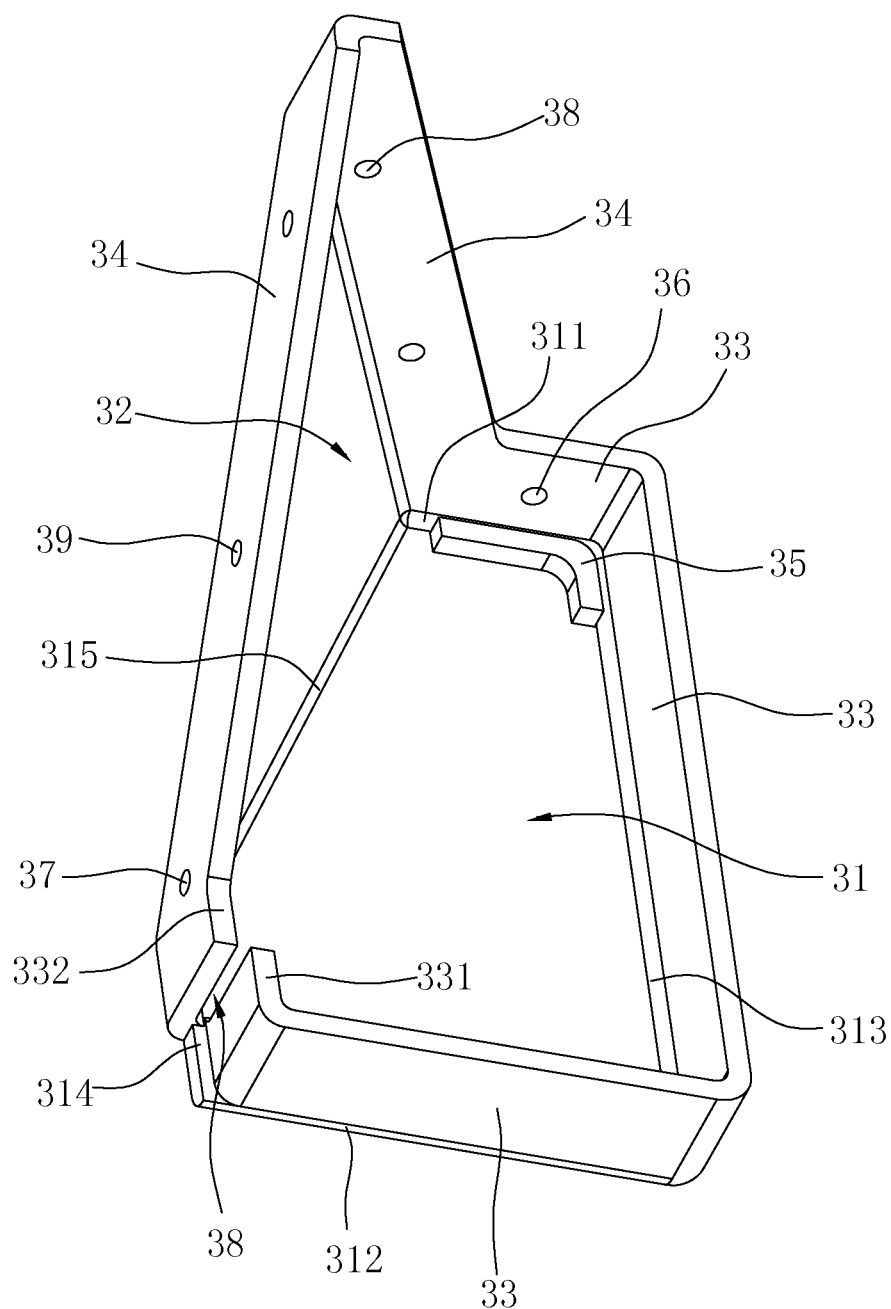
FIG. 2 is a second perspective view of the seal head in accordance with the embodiment of the present invention (seen from the back side of the seal head).
Figure 3:
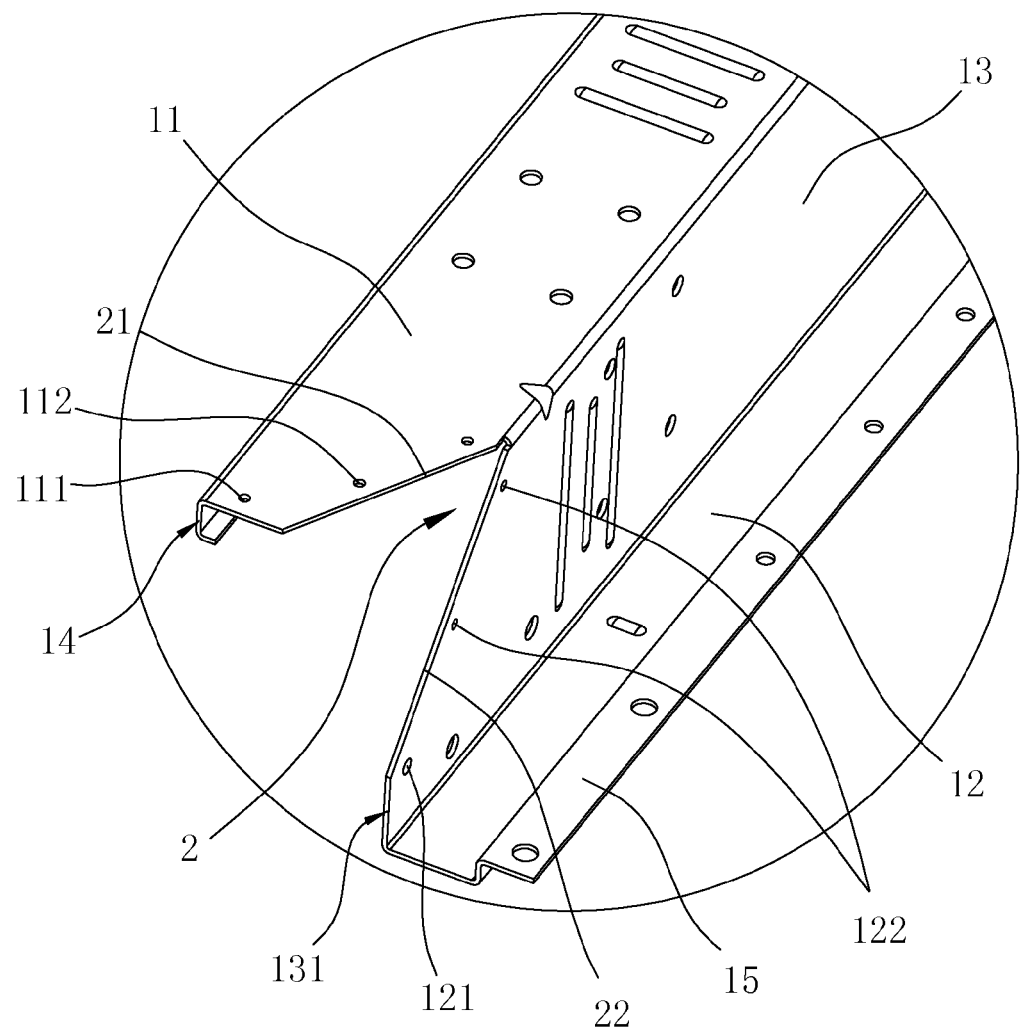
FIG. 3 is a perspective view of a side beam for the seal head in accordance with the embodiment of the present invention.
Figure 4:
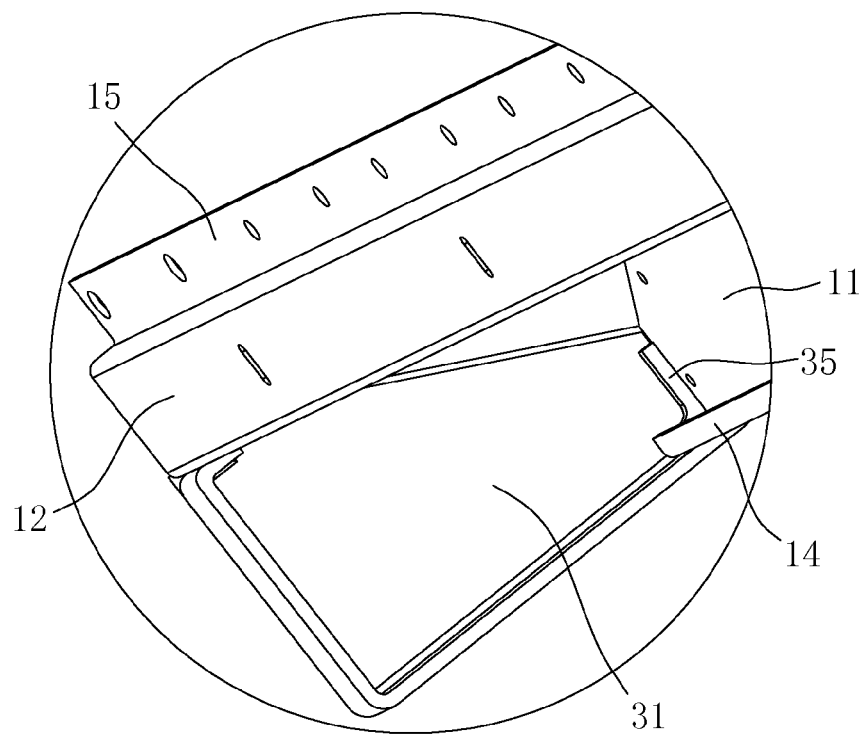
FIG. 4 is a perspective view of the seal head and the side beam when installing.
Figure 5:
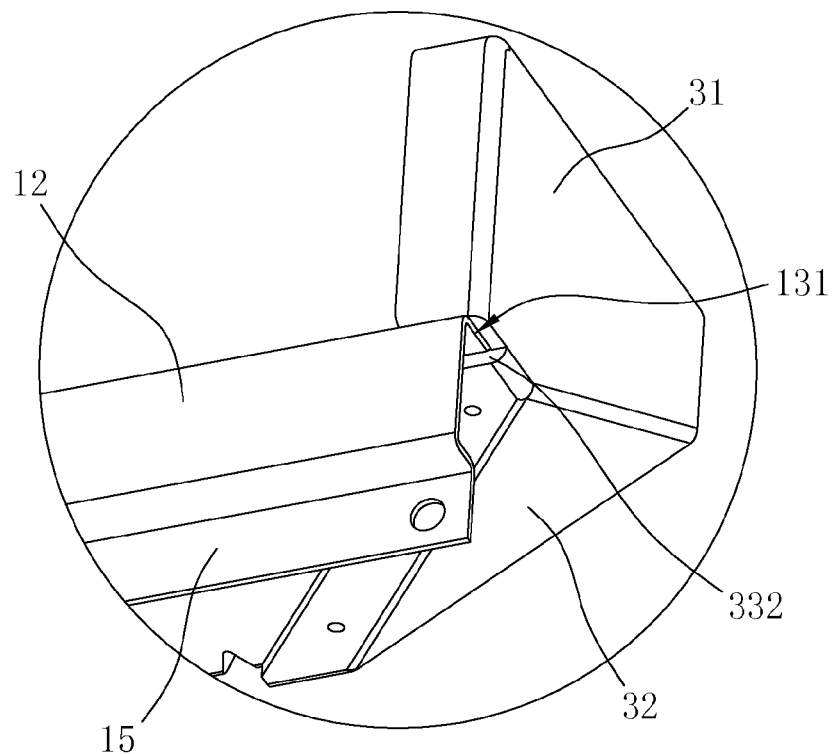
FIG. 5 is a perspective view of the seal head and the side beam when installing.
Figure 6:
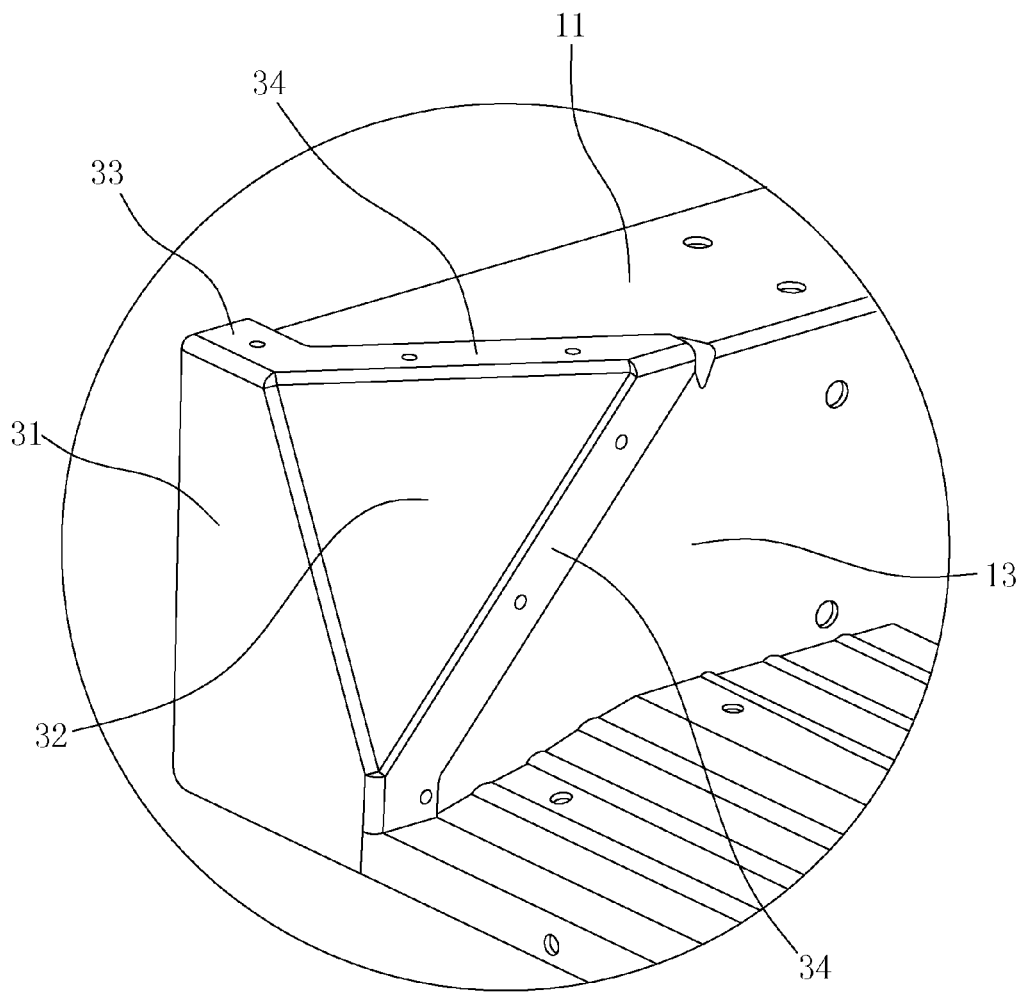
FIG. 6 is a perspective view of the seal head when the seal head is installed on the side beam.

To enable a further understanding of the innovative and technological content of the invention herein, refer to the detailed description of the invention and the accompanying drawings below:

FIGS. 1~6 show a seal head used on the side beam of the vehicle carrier of a preferred embodiment of the present invention. The seal head is connected to a side beam 1 shown in FIG. 3. The structural steel members are adopted as the side beam 1, the cross section of which comprises a first edge 11 and a second edge 12 paralleled to each other. A vertical edge 13, which is connected vertically to the first end of the first edge 11 and the first end of the second edge 12, is arranged between the first edge 11 and the second edge 12, that is, the first edge 11, the second edge 12 and the vertical edge 13 form a Z-shaped structure. Moreover, in order to improve the strength, the second end of the first edge 11 is folded down and inward to form a L-shaped portion as a first bending part 14, the second end of the second edge 12 is folded up and outward to also form a L-shaped portion as a second bending part 15, the upper surface of which is used for laying a vehicle plate.

In order to avoid the tires collision by the side beams, the inner side of the end of the side beam 1 is designed to be a inclined surface structure, that is, the inner side of the end of the side beam 1 is cut to form a triangular notch 2 consisted of a first inclined edge 21 formed by the end of the side edge of the first edge 11 and the second inclined edge 22 formed by the end of the side edge of the vertical edge 13, what's more, the first edge 11 and the first inclined edge 21 are in the same plane, while the vertical edge 13 and the second inclined edge 22 are in the same plane.

In order to match the structure of the side beam, the side beam 1 comprises a main plane 31 covering the front surface of the side beam 1, a side plane 32 connected to the main plane 31 and inclined relative to the main plane 31 to cover the inclined surface of the side beam 1, a first baffle plane 33 perpendicularly connected to the main plane 31, and a second baffle plane 34 extending from the side plane 32. The angle of inclination formed between the main plane 31 and the side plane 32 are the same as that formed between the front surface and the inclined surface of the side beam 1, moreover, the main plane 31, the side plane 32, the first baffle plane 33 and the second baffle plane 34, which are an integrally molded piece via metal pressure or injection molding, form a semi-enclosed cavity at their inner side for receiving the side beam 1.

The main plane 31 has a pentagon shape and includes a first traverse edge 311, a second traverse edge 312 parallel to the first traverse edge 311, a first vertical edge 313 connected to a first end of the first traverse edge 311 and a first end of the second traverse edge 312, a second vertical edge 314 connected to a second end of the second traverse edge 312, an inclined edge 315 respectively connected to a second end of the first traverse edge 311 and the second vertical edge 314. The first baffle plane 33 is connected to the first traverse edge 311, the second traverse edge 312, the first vertical edge 313 and the second vertical edge 314, and a first portion of the first baffle plane 33 that is coupled to the first traverse edge 311. The second portion of the first baffle plane 33 that is coupled to the second vertical edge 314 comprises an inner baffle plane 331 and an outer baffle plane 332 arranged by interval, a slot 38 for receiving the side beam is formed between the inner baffle plane 331 and the outer baffle plane 332. The edge 131 of the front surface of the side beam can be inserted into the slot to achieve the connection between the side beam 1 and the seal head 3. A position protrusion 35, which appears in L-shaped, is provided on the inner side of the main plane 31 and can be stuck in the L-shaped corner formed by the first traverse edge 311 and a first bending part 14 of the side beam 1.

The side plane 32 has a triangular shape with a first edge 321, a second edge 322 and a third edge 323, the first edge 321 is with the same as the inclined edge 315 to form a common boundary, the second baffle plane 34 is coupled to the second edge 322 and the third edge 323.

In order to achieve the connection of the seal head and the side beam to ensure the fixed position on the side beam for the seal head. A first portion of the first baffle plane 33 that is coupled to the first traverse edge 311 and is provided with a first mounting hole 36. The portion of the outer baffle plane 332 that is vertically coupled to the second vertical edge 314 and is provided with a second mounting hole 37. The portion of the second baffle plane 34 that is coupled to the second edge 322 and is provided with third mounting holes 38, while the portion of the second baffle plane 34 that is coupled to the third edge 323 and is provided with fourth mounting holes 39. When installing, a first edge 11 of the side beam 1 is simultaneously abutted on by the seal head along the portion of the first baffle plane 33 coupled to the first traverse edge 311 and the second baffle plane 34 coupled to the second edge 322. A first through hole 111 aligned the first mounting hole 36 and a second through hole 112 aligned the third mounting holes 38 are both mounted on the first edge 11 of the side beam 1. The top of the side beam 1 is fixedly coupled to the seal head via the screw that is passed through the first mounting hole 36 and the first through hole 111, and the screw that is passed through the third mounting holes 38 and the second through hole 112.

The vertical edge 13 of the side beam 1 is simultaneously abutted on by the seal head along the second baffle plane 34 that is coupled to the third edge 323 and the outer baffle plane 332 that is coupled to the second vertical edge 314, accordingly, a side edge 131 of the front portion of the side beam 1 is provided with a third through hole 121 aligned the second mounting hole 37, the vertical edge 13 of the side beam 1 is provided with a fourth through hole 122 aligned the fourth mounting holes 39. The vertical portion of the side beam 1 is fixed with the seal head via the screw passing through the second mounting hole 37 and the third through hole 121, and the screw passing through the fourth mounting holes 39 and the fourth through hole 122.

When the parked vehicle is driven into or out of the parking space, the wheels on both sides of the vehicle will drive into or out the parking space along the inner side of the side beam 1 from the front end of the vehicle carrier. In the case of deviation, a loss prevention side plane 32 of the seal head is touched by the tires firstly, which can avoid the tires running into the sharp-angled portion of the side beam 1 and prevent the tires on both sides of the vehicle from getting scratched, improving the working safety when the vehicle is driven into or out.

In addition, due to the head seal has the function of safety guide and effective avoiding tires getting scratched by edge angle of the side beam 1, which is provided on the end of the side beam 1, what's more, the head seal can increase the rigidity and strength of the side beam 1 to prevent local deformation, which has an effect of reinforcing on the side beam 1. In order to strengthen cautionary effect, phosphor can be added into the injection molding material of the seal head, so as to be seen clearly by the person who is driving in or out of the parking space, effectively avoiding the deviation. Besides, the end of the side beam 1 is in open-type structure at first. The seal head 1 is designed to be installed on the end of the side beam 1 to keep the end of the side beam 1 closed, which ensures the whole appearance to be neat and artistic.

The invention claimed is:

1. A seal head for a side beam of a vehicle carrier, the side beam having a front surface, an inclined surface, and edges, comprising:
    a main plane covering the front surface of the side beam;
    a side plane connected to the main plane and inclined relative to the main plane to cover the inclined surface of the side beam, the side plane and the main plane forming an angle greater than 90 degrees and less than 180 degrees;
    a first baffle plane perpendicularly connected to the main plane; and
    a second baffle plane extending from the side plane;
    wherein the first baffle plane and the second baffle plane cover the edges of the side beam, and the main plane, the side plane, the first baffle plane and the second baffle plane, which are an integrally molded piece, form a semi-enclosed cavity for receiving the side beam.

2. The seal head of claim 1, wherein the main plane has a pentagon shape and includes a first traverse edge, a second traverse edge parallel to the first traverse edge, a first vertical edge connected to a first end of the first traverse edge and a first end of the second traverse edge, a second vertical edge connected to a second end of the second traverse edge, an inclined edge respectively connected to a second end of the first traverse edge and the second vertical edge;
    the first baffle plane is connected to the first traverse edge, the second traverse edge, the first vertical edge and the second vertical edge, and a first portion of the first baffle plane that is coupled to the first traverse edge and is provided with a first mounting hole.

3. The seal head of claim 2, wherein a second portion of the first baffle plane that is coupled to the second vertical edge comprises an inner baffle plane and an outer baffle plane, a slot for receiving the side beam is formed between the inner baffle plane and the outer baffle plane, and the outer baffle plane is provided with a second mounting hole.

4. The seal head of claim 2, wherein a position protrusion of L-shape is provided on an inner side of the main plane.

5. The seal head of claim 1, wherein the side plane has a triangular shape with a first edge, a second edge and a third edge; the first edge is with the same as the inclined edge, the second baffle plane is coupled to the second edge and the third edge, a first portion of the second baffle plane that is coupled to the second edge is provided with a plurality of third mounting holes, and a second portion of the second baffle plane that is coupled to the third edge is provided with fourth mounting holes.

* * * * *